(12) United States Patent
Liu

(10) Patent No.: US 10,296,896 B2
(45) Date of Patent: May 21, 2019

(54) WEARABLE DEVICE AND DATA INTERACTION METHOD THAT IS BASED ON SAID WEARABLE DEVICE

(71) Applicant: JRD COMMUNICATION INC., Guangdong (CN)

(72) Inventor: Zhe Liu, Huizhou (CN)

(73) Assignee: JRD COMMUNICATION INC., Shenzhen (CN)

( * ) Notice: Subject to any disclaimer, the term of this patent is extended or adjusted under 35 U.S.C. 154(b) by 669 days.

(21) Appl. No.: 14/898,596

(22) PCT Filed: Apr. 1, 2015

(86) PCT No.: PCT/CN2015/075659
§ 371 (c)(1),
(2) Date: Dec. 15, 2015

(87) PCT Pub. No.: WO2016/082405
PCT Pub. Date: Jun. 2, 2016

(65) Prior Publication Data
US 2016/0171484 A1    Jun. 16, 2016

(30) Foreign Application Priority Data
Nov. 24, 2014    (CN) .......................... 2014 1 0687520

(51) Int. Cl.
*G06Q 20/34* (2012.01)
(52) U.S. Cl.
CPC ......... *G06Q 20/349* (2013.01); *G06Q 20/341* (2013.01)

(58) Field of Classification Search
CPC ........ G06Q 10/00; G06Q 20/00; G06Q 30/00; G06Q 40/00
USPC ...................................................... 705/3–44
See application file for complete search history.

(56) References Cited

U.S. PATENT DOCUMENTS

| | | | |
|---|---|---|---|
| 8,496,168 B1* | 7/2013 | Miller ................ | G06Q 20/3221 235/379 |
| 8,972,283 B2* | 3/2015 | Hicks ................. | G06K 7/10891 705/17 |
| 2005/0171876 A1* | 8/2005 | Golden ............... | G06Q 10/087 705/30 |
| 2012/0030043 A1* | 2/2012 | Ross ..................... | G06Q 20/20 705/16 |
| 2013/0262298 A1* | 10/2013 | Morley .................. | H04M 1/05 705/39 |
| 2014/0114858 A1* | 4/2014 | Adams ................ | G06Q 20/105 705/44 |

(Continued)

*Primary Examiner* — Frantzy Poinvil
(74) *Attorney, Agent, or Firm* — Shimokaji IP

(57) ABSTRACT

A wearable device and a data interaction method that is based on said wearable device is disclosed. The wearable device can comprise a card reading chip, a micro control chip and a chip connected thereto. The card reading chip can be used to carry out a first data write operation on the payment account of the chip as controlled by the micro control chip, such that the payment account has the recharging data. The chip can be used to deduct the interaction data from the payment account. The wearable device can be used to replace a conventional swipe card reader in recharging and interaction, and the portability of the wearable device can greatly improve the convenience of an e-card solution.

20 Claims, 1 Drawing Sheet

(56) References Cited

U.S. PATENT DOCUMENTS

| | | | |
|---|---|---|---|
| 2015/0025917 A1* | 1/2015 | Stempora | G06Q 40/08 705/4 |
| 2015/0242837 A1* | 8/2015 | Yarbrough | G06Q 20/327 705/44 |
| 2016/0171487 A1* | 6/2016 | Deliwala | G06Q 20/3278 705/41 |

* cited by examiner

WEARABLE DEVICE AND DATA INTERACTION METHOD THAT IS BASED ON SAID WEARABLE DEVICE

TECHNICAL FIELD

The present disclosure relates to the field of data interaction technologies, and in particular relates to a wearable device and a data interaction method that is based on said wearable device.

BACKGROUND

Along with the development of communication electronic technologies, e-business interaction has become an integral part of people's lives. As an important component of e-business interaction, mobile payments, such as e-cards, have been widely used by the public due to its advantage of face-to-face interaction.

Currently, data interaction solutions for e-cards may be based on one online account and one payment account (an offline wallet or public transport card), wherein the online account can be used for online payment to recharge the payment account. A recharge solution may be that a user is provided, at a fee, with a mini card reader valued at around 100 Yuan, and the recharge can be completed by means of a card reading chip embedded in the mini card reader. Correspondingly, the interaction solution may include that data interaction is performed by means of the card reading chip embedded in the mini card reader.

Since the loss of a public transport card as the payment account cannot be reported, people generally are unwilling to recharge a relatively large amount to the card. Therefore, there may be frequent recharging of the payment account. The mini card reader is not convenient to carry around and recharging queues are criticized by the public. It can be seen that the current data interaction solutions for e-cards can be inconvenient for mobile payment, in particular for recharging.

SUMMARY

The present disclosure may provide a wearable device and a data interaction method that is based on said wearable device, which can improve the convenience of recharging e-cards.

In an embodiment, a wearable device is provided, comprising a card reading chip, a micro control chip, a chip and a communications module connected thereto, and an antenna connected to the chip. At the recharging stage of data interaction, the card reading chip can be used to carry out a first data write operation on a payment account of the chip as controlled by the micro control chip, such that the payment account has the recharging data to be recharged; when data interaction includes mobile payment by swiping a card, the antenna may be connected to a first terminal, such that the first terminal carries out a second data write operation on the payment account unilaterally with the energy supplied by the antenna, to deduct interaction data from the payment account; during online payment data interaction, the card reading chip can deduct the interaction data from the payment account of the chip as controlled by the micro control chip. The communications module can be used to establish connection with a second terminal such that the payment account is bundled with an online account of the second terminal. The micro control chip can obtain a pre-configuration of the second terminal via the communications module and can control the card reading chip to make the online payment according to the pre-configuration. The pre-configuration can comprise any combination of defining password-free operations during the data interaction, with upper limits of single time and/or single day interaction data and upper limits of the interaction data automatically transferred into the payment account by the online account.

In an embodiment, at the recharging stage, when the card reading chip completes the first data write operation, the card can be further used to perform a data read operation on the chip to ensure that the recharging data possessed by the payment account is the recharging data to be recharged.

In an embodiment, the wearable device further can comprise a display screen and a vibration motor. The display screen can be used to display the recharging data to be recharged, and the vibration motor can be used to vibrate as a prompt.

In an embodiment, the micro control chip can be further used to confirm whether the data possessed by the payment account is greater than or equal to the interaction data. If the data possessed by the payment account is not greater or equal to the interaction data, the micro control chip can be used to control the display screen and the vibration motor to prompt, and, if the data possessed by the payment account is greater or equal to the interaction data, the micro control chip can further determine whether the interaction confirmation option is turned on. If the interaction confirmation option is turned on, the micro control chip can control the display screen to display the interaction data and control the vibration motor to vibrate as a prompt. If the interaction confirmation option is not turned on, the micro control chip can control the card reading chip to deduct the interaction data from the payment account, and can control the display screen and the vibration motor prompt.

In an embodiment, after the interaction data is deducted from the payment account, the communications module can be further used to transmit the interaction data to the second terminal as controlled by the micro control chip.

In an embodiment, a wearable device can be provided, comprising a card reading chip, a micro control chip and a chip connected thereto. At the recharging stage of data interaction, the card reading chip can be used to carry out a first data write operation on the payment account of the chip as controlled by the micro control chip, such that the payment account has the recharging data; at the interaction stage of data interaction, the chip can be used to deduct the interaction data from the payment account.

In an embodiment, the wearable device can comprise an antenna connected to the chip. The antenna can be used to connect to a first terminal such that the first terminal carries out a second data write operation on the payment account with the energy supplied by the antenna to deduct the interaction data from the payment account.

In an embodiment, the interaction stage can comprise online payment, and the card reading chip can be used to deduct the interaction data from the payment account as controlled by the micro control chip.

In an embodiment, the wearable device further can comprise a communications module, and the communications module can be used to establish connection with a second terminal such that the payment account is bundled with the online account of the second terminal.

In an embodiment, the micro control chip can be used to obtain a pre-configuration of the second terminal via the communications module and can control the card reading chip according to the pre-configuration, the pre-configuration comprising any combination of defining password-free operations during the data interaction, with upper limits of single time and/or single day interaction data and upper limits of the interaction data automatically transferred into the payment account by the online account.

In an embodiment, at the recharging stage, when the card reading chip completes the first data write operation, it can be used to perform a data read operation on the chip to ensure that the recharging data possessed by the payment account is the recharging data to be recharged.

In an embodiment, the wearable device can comprise a display screen and a vibration motor, with the display screen used to display the recharging data to be recharged, and the vibration motor can be used to vibrate as a prompt.

In an embodiment, the micro control chip can be used to confirm whether the data possessed by the payment account is greater than or equal to the interaction data. If the data possessed by the payment account is not greater than or equal to the interaction data, the micro control chip can be used to control the display screen and the vibration motor to prompt. If the data possessed by the payment account is greater than or equal to the interaction data, the micro control chip can determine whether the interaction confirmation option is turned on. If the interaction confirmation option is turned on, the micro control chip can control the display screen to display the interaction data and control the vibration motor to vibrate as a prompt. If the interaction confirmation option is not turned on, the micro control chip can control the card reading chip to deduct the interaction data from the payment account, and control the display screen and the vibration motor to prompt.

In an embodiment, after the interaction data is deducted from the payment account, the communications module can be used to transmit the interaction data to the second terminal as controlled by the micro control chip.

In an embodiment, a data interaction method is provided, the wearable device comprising a card reading chip, and a micro control chip and a chip connected thereto, the method comprising: at the recharging stage of data interaction, the card reading chip is used to carry out a data write operation on the payment account of the chip as controlled by the micro control chip, such that the payment account has the recharging data to be recharged; at the interaction stage of data interaction, the card reading chip deducts the interaction data from the payment account of the chip as controlled by the micro control chip.

Advantageous effects of the examples of the present invention, unlike the prior art, perform data write operations on the payment account of the chip of an e-card via a card reading chip of a wearable device, use the wearable device to replace a conventional swipe card reader in recharging and interaction, and the portability of the wearable device can greatly improve the convenience of an e-card solution.

DETAILED DESCRIPTION

Technical solutions in embodiments of the present invention will be clearly and fully described below with reference to the accompanying drawings in the embodiments of the present disclosure. As is apparent, the embodiments described below are only some embodiments of the present invention, rather than all embodiments thereof. All other embodiments obtained by those skilled in the art without making innovative effort and on the basis of the embodiments of the present invention shall be encompassed by the present invention.

Figure 1:
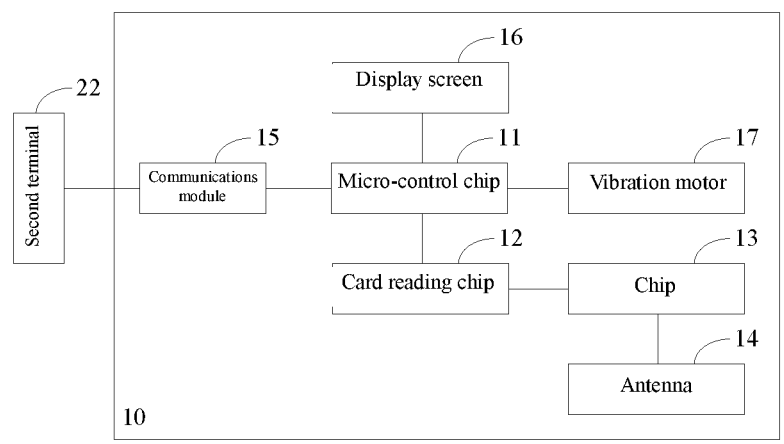
FIG. 1 depicts a functional block diagram of a wearable device in an embodiment of the present invention.

FIG. 1 is a functional block diagram of a wearable device in a preferred embodiment of the present invention. In FIG. 1, the wearable device 10 of the present embodiment comprises a micro control chip 11, a card reading chip 12 and a chip 13; the micro control chip 11 and the chip 13 can be connected to the card reading chip 12, which can be electrically connected so as to realize communications therebetween.

At the recharging stage of data interaction, the card reading chip 12 is can be used to carry out a first data write operation on the payment account possessed by the chip 13 as controlled by the micro control chip 11, such that the payment account can have the recharging data. At the interaction stage of data interaction, the chip 13 can be used to deduct the interaction data from the payment account.

In an embodiment, the deduction of interaction data can include two modes, one being similar to the mobile payment by swiping a card in today's life. The wearable device 10 can approach a swipe card reader and perform a data write operation on the payment account of the chip 13 via NFC (Near Field Communication), to deduct the interaction data from the payment account. With online payment, the card reading chip 12 can carry out a data write operation on the payment account of the chip 13 as controlled by the micro control chip 11 to deduct the interaction data from the payment account.

A data write operation can be performed on the payment account possessed by the chip 13 of an existing e-card via the card reading chip 12 of the wearable device 10. The payment account, such as an offline wallet, can be connected with the online payment. The wearable device 10 can be used to replace the conventional swipe card reader in recharging and interaction. Mobile payment can be realized directly with the wearable device 10, and the convenience of an e-card solution can be greatly improved through the portability of the wearable device 10.

Figure 2:
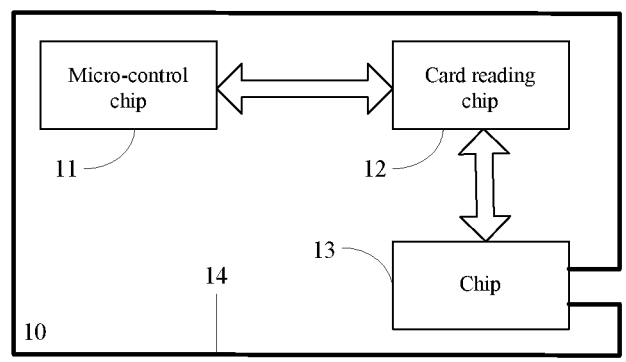
FIG. 2 illustrates the structure of an application scenario of the wearable device shown in FIG. 1.

FIG. 2 illustrates the structure of an application scenario of the wearable device 10 shown in FIG. 1. As shown in FIG. 1 and FIG. 2, the wearable device 10 can comprise an antenna 14 connected to the chip 13.

When the interaction stage is mobile payment by swiping a card, the antenna 14 can be used to establish connection with a first terminal when the wearable device 10 approaches the first terminal, such as a swipe card reader, such that the first terminal carries out a second data write operation on the payment account of the chip 13 with the energy supplied by the antenna 14 to deduct the interaction data from the payment account.

In the wearable device 10 shown in FIG. 2, the ISO14443 protocol can be selected for communication connection between the micro control chip 11 and the card reading chip 12 and between the card reading chip 12 and the chip 13. A protocol similar to USART (Universal Synchronous/Asynchronous Receiver/Transmitter) can be employed in the part of transport layer protocol, comprising a synchronous clock of mobile payment and a pin, wherein the pin can be used for the output TX and reception RX of communicated and transmitted data, namely achieving the pin multiplexing.

The micro control chip 11 can be an MCU (Micro Control Unit) chip, preferably an STM32 chip, which can be used to control the card reading chip 12 to implement data read/write operations, as well as to configure the wearable device 10 to an intelligent mode.

The card reading chip 12 can be sized to be 4*4 mm, and has a power consumption below micro-amp when not used, leading to a relatively low power consumption. In addition, the card reading chip 12 can integrate the ISO7816 protocol in the encryption and message parts, and an SPI (Serial Peripheral Interface) or I2c (Inter-Integrated Circuit) interface may certainly be selected, to integrate a contactless card or a contact card reader. The card reading chip 12 in the present embodiment may satisfy more strict requirements by some finance-related payment scenarios, and can overcome the difficulties in design of implementation of the entire protocol and highly intensive encryption through the micro control chip 11, as well as the drawbacks that hardware decoding is may be needed to meet many industrial standards.

The chip 13 can be encapsulated onto the circuit board of the wearable device 10, which can support dual interfaces to simultaneously support the ISO14443 protocol for contactless cards and the ISO7816 protocol for contact cards. When a card reader is used for mobile payment by swiping a card, the antenna 14 can supply energy to revise the data of the payment account possessed by the chip 13; during recharging and online payment, the micro control chip 11 can control the card reading chip 12 to directly revise the data via the ISO7816 protocol.

The antenna 11 can be used to ensure that the wearable device 10 can be compatible with card readers commonly used in today's life. In addition, the chip 13 can be placed within the entire wearable device 10, such that the area of the antenna 11 is as large as possible to ensure the practicability of card swiping.

In FIG. 1, the wearable device 10 of the present embodiment can comprise a communications module 15, a display screen 16 and a vibration motor 17. The specific principle and process of mobile payment achieved by the wearable device 10 will be described in detail below with reference to FIG. 1.

The communications module 15 can establish connection with a second terminal 22 such that the payment account of the chip 13 is bundled with the online account of the second terminal 22. The micro control chip 11 may further obtain a pre-configuration of the second terminal 22 via the communications module 15 and can control the card reading chip 12 to carry out corresponding operations according to the pre-configuration. The pre-configuration can comprise any one or a combination of at least two of defining password-free operations during the data interaction, with upper limits of single time and/or single day interaction data and upper limits of the interaction data automatically transferred into the payment account by the online account, and the pre-configuration can comprise the account number of the payment account and the information of the second terminal 22, such as a cell phone number bundling.

When a user desires to carry out a recharging of the payment account, the recharging data can be configured via an APP associated with the second terminal 22, then the recharging data can be encrypted according to the protocol requirements, and can be subsequently transmitted via the communications module 15 by means of transparent transmission to the wearable device 10.

The micro control chip 11 can perform operations of security check and decryption on the encrypted data received by the wearable device 10, and can subsequently control the card reading chip 12 to carry out a first data write operation on the payment account of the chip 13, such that the payment account has the recharging data.

In an embodiment, the micro control chip 11 can control the card reading chip 12 to carry out a data write operation on the payment account of the chip 13 to ensure that the recharging data possessed by the payment account is the recharging data. When the entire data write/read operation is successful, the micro control chip 11 can generate a recharging successful transaction message, and control the communications module 15 to display the recharging successful transaction message to the user via the display screen 16. At the same time, the display screen 16 can also display the recharging data of the current recharging and prompt the user by means of the vibration of the vibration motor 17. Subsequently, the micro control chip 11 can further control the communications module 15 to transmit the current interaction information back to the second terminal 22 for unified management.

When a user desires to perform the card swiping interaction of the payment account, the wearable device 10 can be placed close to the first terminal of the transaction party, and the first terminal can automatically read the interaction data of the current interaction and deduct the interaction data from the payment account.

To further improve the user experience, the micro control chip 11 can be used to confirm whether the data possessed by the payment account is greater than or equal to the interaction data to determine if the current interaction can be performed. If the data possessed by the payment account is lower than the interaction data of the current interaction, the micro control chip 11 can control the display screen 16 and the vibration motor 17 to prompt the user to recharge.

If the data possessed by the payment account is greater than or equal toe than the interaction data, the micro control chip 11 can further determine whether the interaction confirmation option displayed by the display screen 16 is turned on. If it is turned on, the micro control chip 11 can control the display screen 16 to display the interaction data, and can control the vibration motor 17 to vibrate to prompt the user for confirmation, thereby facilitating a prompt transaction.

If it is not turned on, the micro control chip 11 can control the card reading chip 12 to deduct the interaction data directly from the payment account, and can control the display screen 16 and the vibration motor 17 to prompt that the current interaction is completed.

After the current interaction, similarly, the micro control chip 11 can further control the communications module 15 to transmit the current interaction information back to the second terminal 22 for unified management.

Through the above description, the user may perform transaction confirmation in real time on the interaction content and interaction amount via the second terminal 22 or the wearable device 10, perform inquiries and management on historical interaction records, and in addition, update the account information of the online account.

The wearable device 10 may correspond to logging onto a payment account, and the second terminal 22 may correspond to logging onto an online account. The online account can be similar to an electronic account that can be bundled with a bank card account or a UnionPay cell phone bank account, such as Yu E Bao and Li Cai Tong, or other electronic note counting accounts and sign-in queuing service accounts.

The data interaction can be described in detail with electronic cash transaction payment, such as payment by a public transport card, for example. With the wearable device 10 as the payer terminal of the transaction, the corresponding payment account can be the electronic cash payment account in transaction payments, and the first terminal can be, for example, a vehicle-borne card reader or a card reader on the subway gate. In addition, the first terminal, for example, can use a card reader and the second terminal 22 can use a smart phone. Both may be any terminal device with the above transaction payment function, including any combination of PDA (Personal Digital Assistant or a tablet) and portable mobile communication terminals.

In addition, the wearable device 10 mentioned throughout the embodiments of the present invention can use, for example, a smart band, but the device is certainly not limited to a smart band, and can be any terminal with mobile payment functions, including smart watches, embedded devices disposed inside jewelries and clothing accessories. The connection between the communications module 15 of the wearable device 10 and the second terminal 22 may be wireless, including near-field communications, Bluetooth and other connection modes.

It should also be understood that the embodiment of the wearable device 10 shown in FIG. 1 is only illustrative, and other embodiments may be possible in practical implementations. For example, the wearable device may comprise a sensor module, a battery and power management module, a charging module, and a Flash memory. The sensor module may comprise an accelerometer for identifying transaction actions of a user and collecting action information, performing functions such as step counting and calorie consumption of the user via the accelerometer, and providing in real time notifications of cell phone messages, calls, clock and calendar information. The battery and power management module can be used for power supply to the wearable device 10 and low-power power management. The charging module can be used to realize the charging function of the wearable device 10. The Flash memory can be used for storing system programs and associated data of the wearable device 10.

The embodiments of the present invention can further provide a data interaction method that is based on the wearable device 10.

The payment account can be bundled with the online account in the embodiments of the present invention, which can allow a user to use a smart phone to directly query the amount in a public transport card and complete the recharging of the public transport card via Bluetooth, and at the same time, can allow a wireless card reader of a third party transaction institution to rapidly complete a payment transaction procedure on the wearable device 10. Relative to conventional public transport cards and UnionPay cards, the wearable device 10 can be carried about by the user, can be applicable for more use scenarios, and can be applicable for more natural payment actions during payment, which can greatly improve the convenience of card swipe during travel and can significantly lower the probability that a user forgets to carry the public transport card when leaving home.

The wearable device 10 can be used for electronic note counting accounts and sign-in queuing services of meetings and important events.

It should be further noted that only embodiments of the present invention are described above, which do not intend to limit the scope of the present invention. Any equivalent structure or equivalent procedure variation made according to the Specification and Drawings of the present invention, for example, combinations of technical features of various embodiments, or direct or indirect applications in other related technical fields, shall similarly be encompassed by the present invention.

The invention claimed is:

1. A wearable device, wherein the wearable device comprises a card reading chip, a micro control chip communicatively connected to the card reading chip, an additional chip communicatively connected to the card reading chip and a communications module connected to the card reading chip, and an antenna connected to the additional chip, wherein a communication connection between the micro control chip and the card reading chip is via a protocol comprising an International Organization for Standardization 14443 (ISO 14443) protocol, wherein a communication connection between the card reading chip and the additional chip is via a protocol comprising the ISO14443 protocol, and wherein:
at a recharging stage of data interaction, the card reading chip, controlled by the micro control chip, is configured to carry out a first data write operation on a payment account of the additional chip, thereby the payment account has a recharging data;
in response to an interaction stage of data interaction being mobile payment by swiping a card, the antenna is connected to a first terminal, the first terminal is configured to carry out a second data write operation on the payment account unilaterally with an energy supplied by the antenna to deduct an interaction data from the payment account;
in response to the interaction stage being online payment, the card reading chip, controlled by the micro control chip, is configured to deduct the interaction data from the payment account of the additional chip, wherein the communications module is configured to establish connection with a second terminal so that the payment account is bundled with an online account of the second terminal, wherein the micro control chip is configured to obtain a pre-configuration of the second terminal via the communications module and is configured to control the card reading chip to make the online payment according to the pre-configuration, the pre-configuration comprising any combination of defining password-free operations during the data interaction, upper limits of single time and/or single day interaction data and upper limits of the interaction data automatically transferred into the payment account by the online account.

2. The wearable device according to claim 1, wherein, when the card reading chip completes the first data write operation, the card reading chip is further configured to perform a data read operation on the additional chip to ensure that the recharging data possessed by the payment account is the recharging data.

3. The wearable device according to claim 1, wherein the wearable device further comprises a display screen and a vibration motor, the display screen being used to display the recharging data to be recharged, and the vibration motor being used to vibrate as a prompt.

4. The wearable device according to claim 3, wherein the micro control chip is further used to confirm whether the data in the payment account is greater than or equal to the interaction data, and if not, to control the display screen and the vibration motor to prompt,
if the data possessed by the payment account is greater than or equal to the interaction data, the micro control chip determines whether an interaction confirmation option is turned on;
if the interaction confirmation option is turned on, the micro control chip controls the display screen to display the interaction data and controls the vibration motor to vibrate as a prompt;

if the interaction confirmation option is not turned on, the micro control chip controls the card reading chip to deduct the interaction data from the payment account, and controls the display screen and the vibration motor to prompt.

5. The wearable device according to claim 1, wherein, after the interaction data is deducted from the payment account, the communications module, by the control of the micro control chip, transmits the interaction data to the second terminal.

6. A wearable device, wherein the wearable device comprises a card reading chip, a micro control chip communicatively connected to the card reading chip, and an additional chip connected to the card reading chip, wherein a communication connection between the micro control chip and the card reading chip is via a protocol comprising an International Organization for Standardization 14443 (ISO 14443) protocol, wherein a transport layer protocol comprises a synchronous clock of mobile payment and a pin, and wherein:

at a recharging stage of data interaction, the card reading chip is configured to carry out a first data write operation on a payment account of the additional chip as controlled by the micro control chip, thereby the payment account has a recharging data; and at an interaction stage of data interaction, the additional chip is configured to deduct an interaction data to be interacted from the payment account.

7. The wearable device according to claim 6, wherein the wearable device further comprises an antenna connected to the additional chip, the antenna being configured to connect to a first terminal so that the first terminal carries out a second data write operation on the payment account unilaterally with an energy supplied by the antenna to deduct the interaction data from the payment account.

8. The wearable device according to claim 6, wherein the interaction stage comprises online payment, and the card reading chip is further configured to deduct the interaction data from the payment account as controlled by the micro control chip.

9. The wearable device according to claim 6, wherein the wearable device further comprises a communications module configured to establish connection with a second terminal so that the payment account is bundled with an online account of the second terminal.

10. The wearable device according to claim 9, wherein the micro control chip is further configured to obtain a pre-configuration of the second terminal via the communications module and control the card reading chip according to the pre-configuration, wherein the pre-configuration comprises any combination of defining password-free operations during the data interaction, upper limits of single time and/or single day interaction data, and upper limits of the interaction data automatically transferred into the payment account by the online account.

11. The wearable device according to claim 6, wherein, at the recharging stage, when the card reading chip completes the first data write operation, it is further configured to perform a data read operation on the additional chip to ensure that the recharging data possessed by the payment account is the recharging data.

12. The wearable device according to claim 6, wherein the wearable device further comprises a display screen and a vibration motor, the display screen being configured to display the recharging data, and the vibration motor being used to vibrate as a prompt.

13. The wearable device according to claim 12, wherein the micro control chip is further configured to confirm whether the data possessed by the payment account is greater than or equal to the interaction data, and if not, to control the display screen and the vibration motor to prompt, if the payment account is greater than or equal to the interaction data, the micro control chip determines whether an interaction confirmation option is turned on;

if the interaction confirmation option is turned on, the micro control chip is configured to control the display screen to display the interaction data and control the vibration motor to vibrate as a prompt; and if the interaction confirmation option is not turned on, the micro control chip is configured to control the card reading chip to deduct the interaction data from the payment account, and control the display screen and the vibration motor to prompt.

14. The wearable device according to claim 10, wherein after the interaction data is deducted from the payment account, the communications module, controlled by the micro control chip, is configured to transmit the interaction data to the second terminal.

15. A data interaction method that is based on a wearable device, wherein the wearable device comprises a card reading chip, a micro control chip communicatively connected to the card reading chip and an additional chip communicatively connected to the card reading chip, wherein the micro control chip comprises an MCU (Micro Control Unit) chip, the method comprising:

carrying out, by the card reading chip, a data write operation on a payment account of the additional chip as controlled by the micro control chip, thereby the payment account has a recharging data; and the card reading chip, controlled by the micro control chip, deducts an interaction data from the payment account of the additional chip.

16. The data interaction method of claim 15, wherein the recharging data is encrypted.

17. The data interaction method of claim 15, wherein the micro control chip decrypts the recharging data received from the wearable device.

18. The data interaction method of claim 15, wherein the micro control chip receives the recharging data and displays a message upon successful completion of receiving the recharging data.

19. The data interaction method of claim 15, wherein a first terminal automatically reads the interaction data in response to being placed in close proximity to the wearable device.

20. The data interaction method of claim 19, wherein the first terminal automatically deducts the interaction data from the payment account in response to being placed in close proximity to the wearable device.

* * * * *